Figure 3:
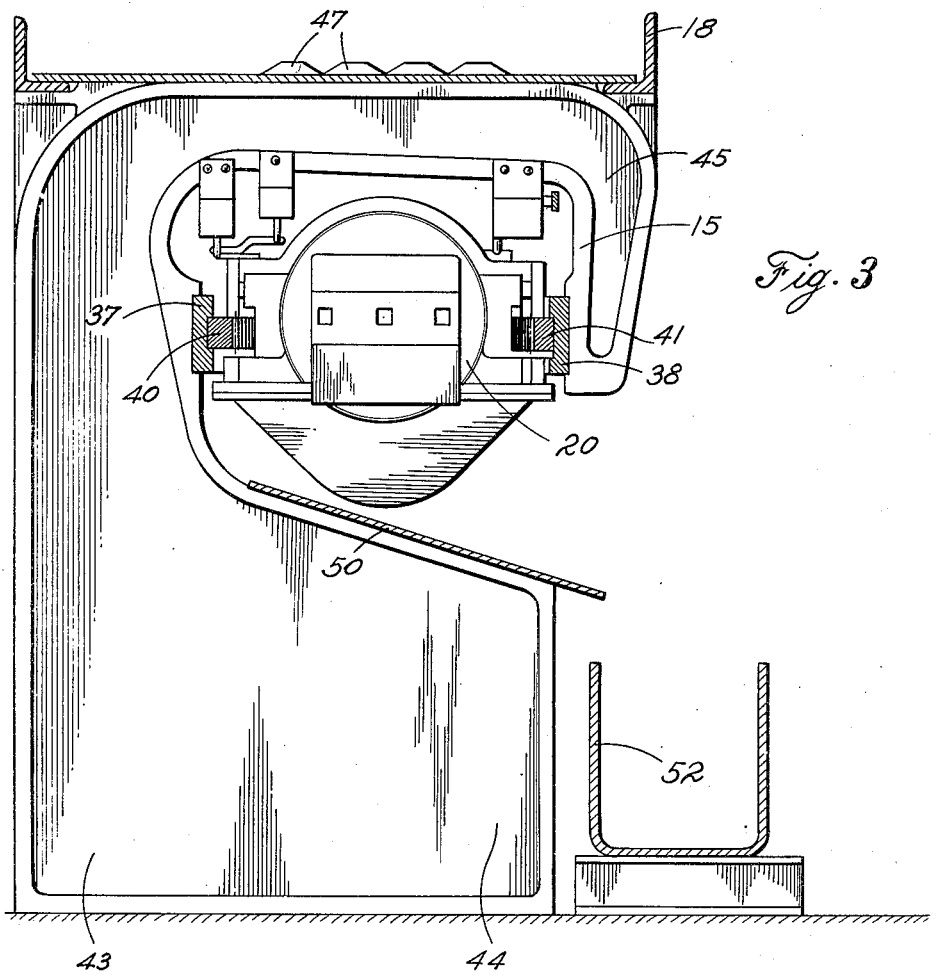

Aug. 19, 1952  D. V. STROCK  2,607,474
DRAW BENCH
Filed April 15, 1946  7 Sheets-Sheet 1
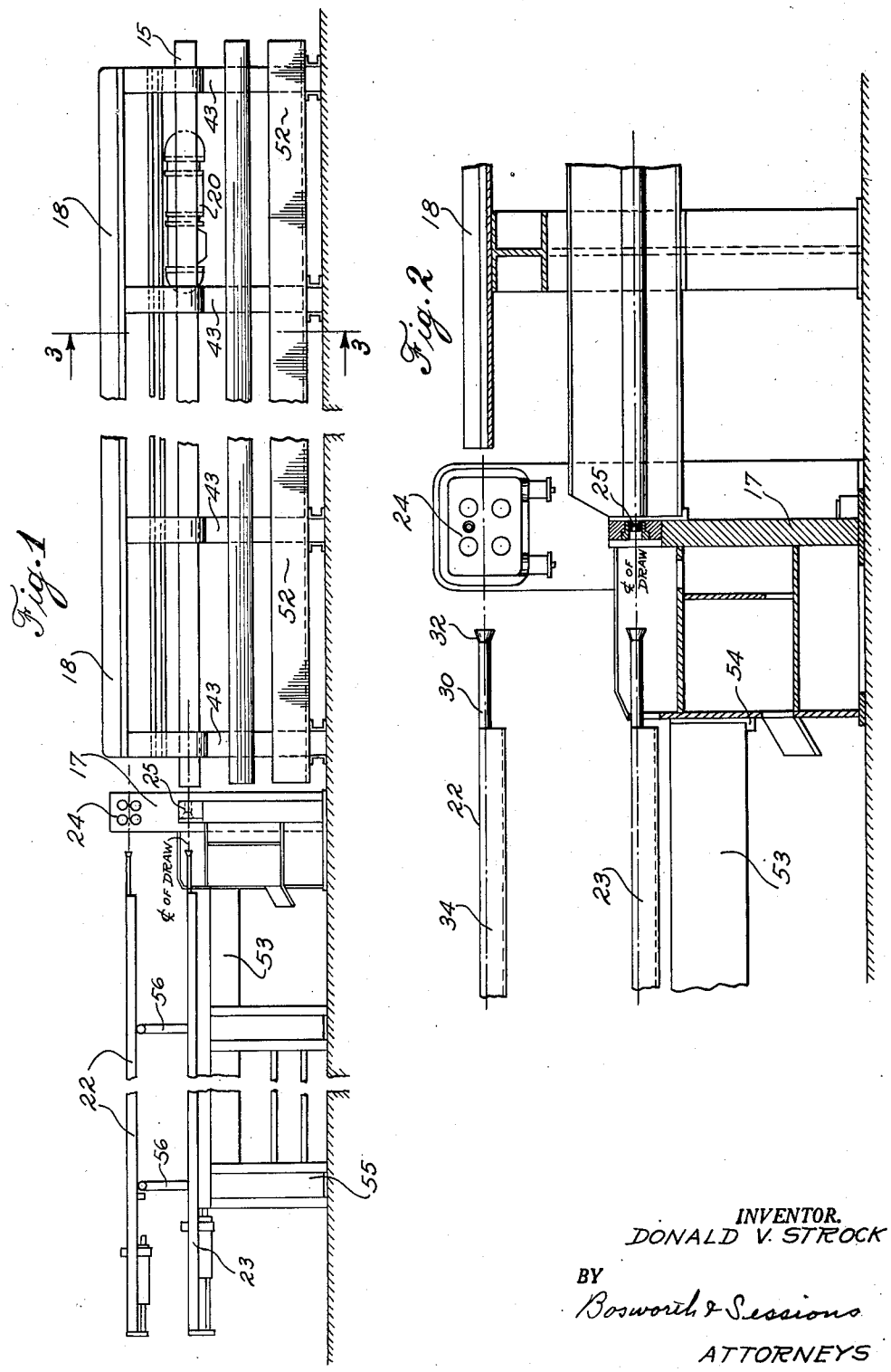
INVENTOR.
DONALD V. STROCK
BY
Bosworth & Sessions
ATTORNEYS Aug. 19, 1952 D. V. STROCK 2,607,474
DRAW BENCH
Filed April 15, 1946 7 Sheets-Sheet 2

INVENTOR.
DONALD V. STROCK
BY
Bosworth & Sessions
ATTORNEYS

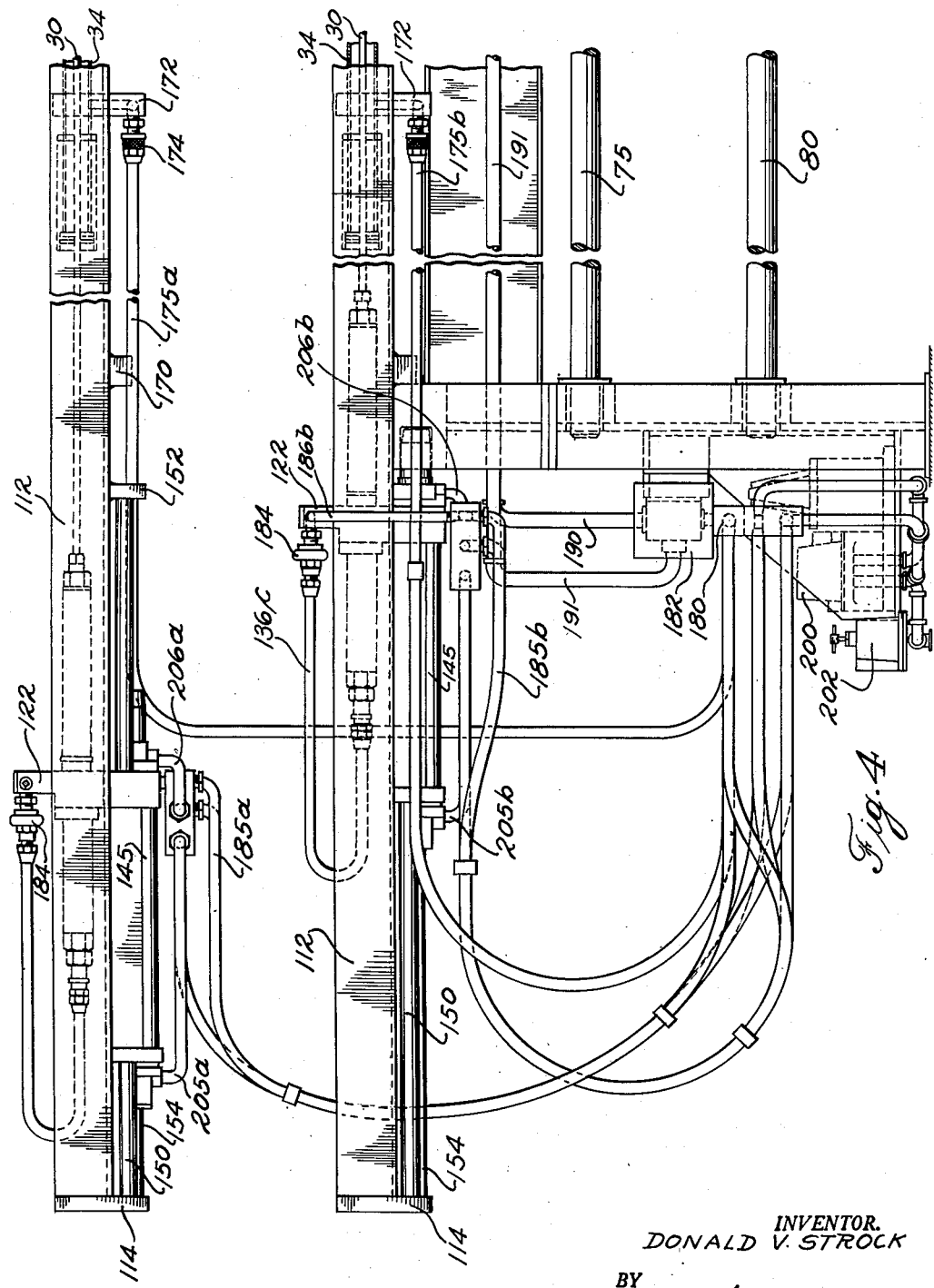

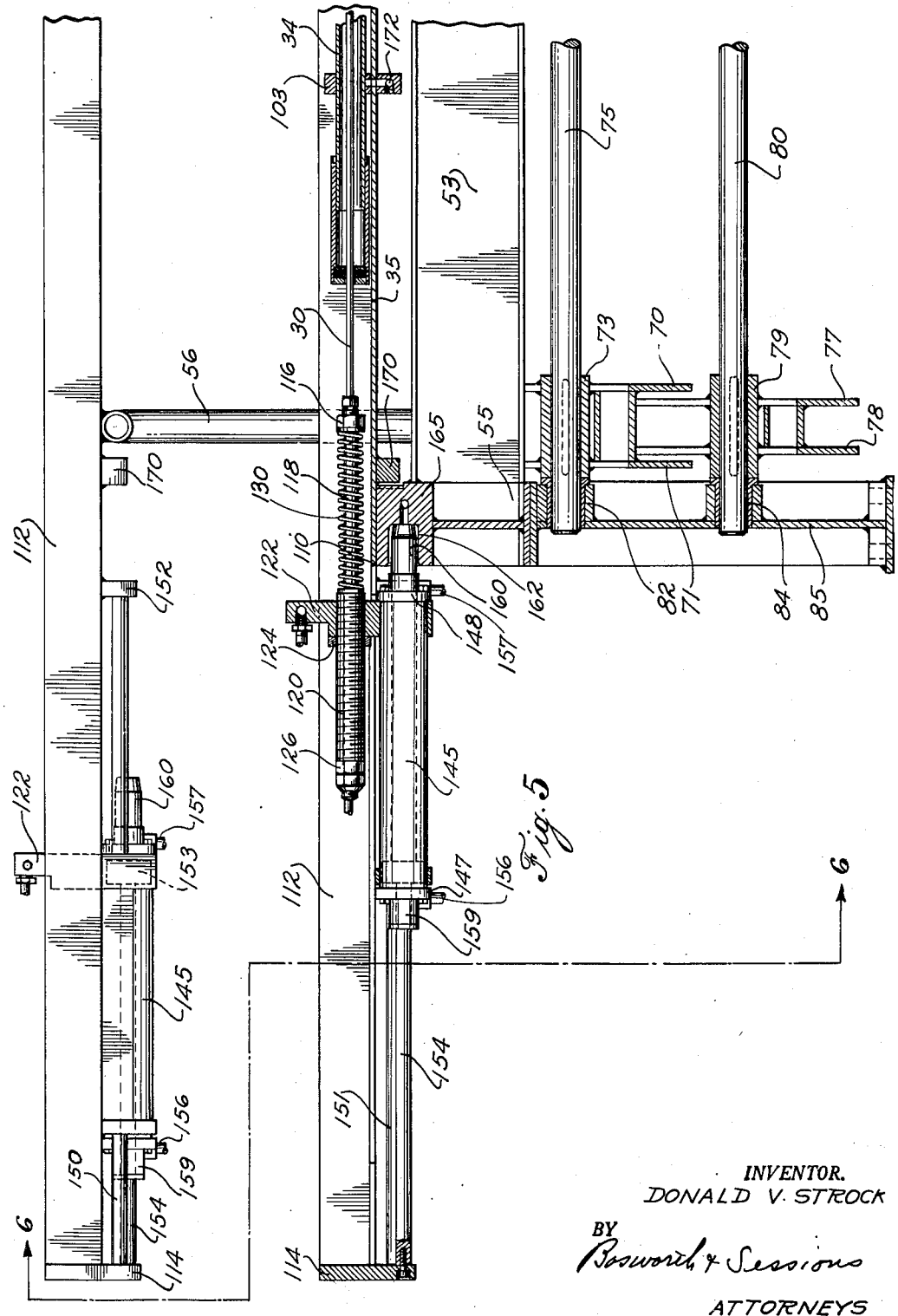

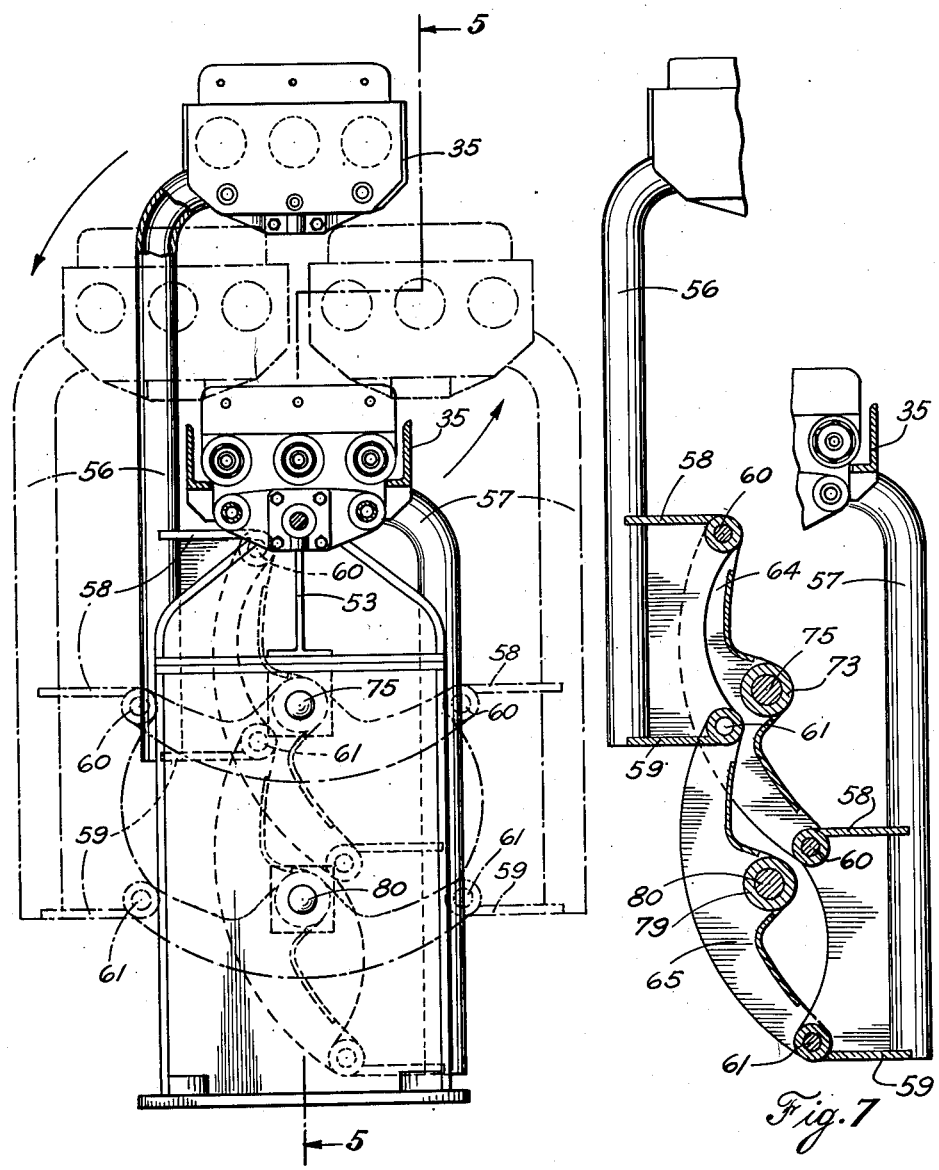

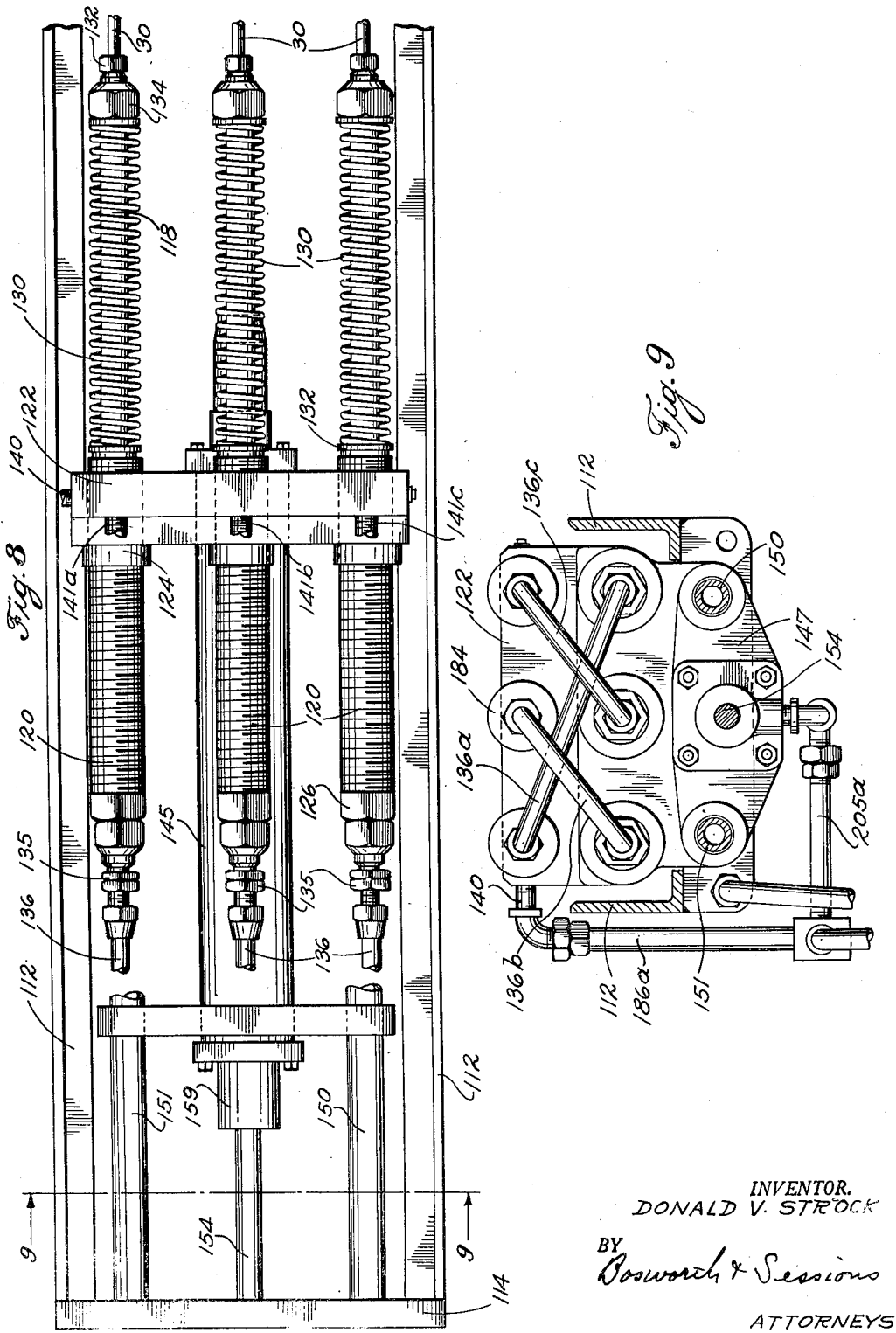

Aug. 19, 1952   D. V. STROCK   2,607,474
DRAW BENCH
Filed April 15, 1946   7 Sheets-Sheet 7
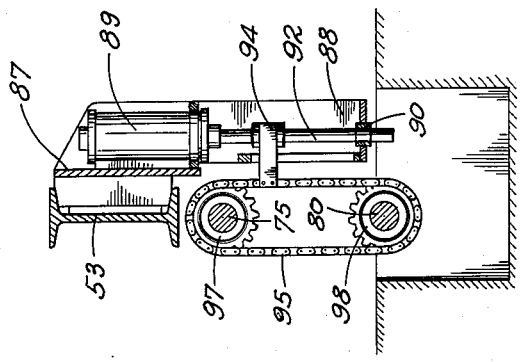
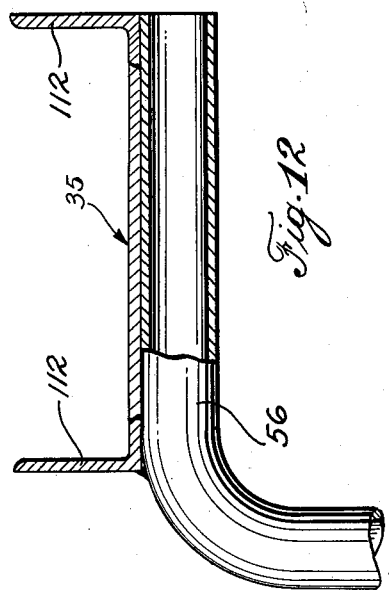
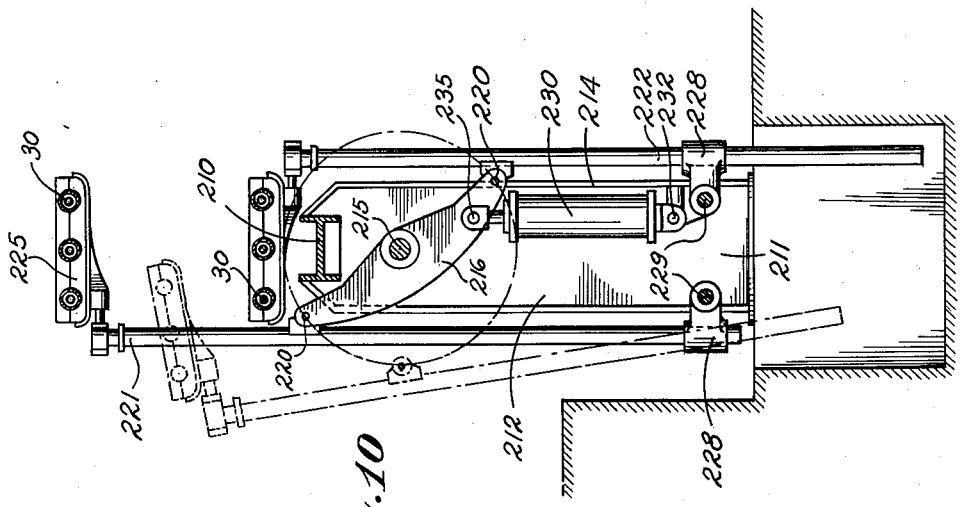
INVENTOR.
DONALD V. STROCK
BY
Bosworth & Sessions
ATTORNEYS Patented Aug. 19, 1952

2,607,474

UNITED STATES PATENT OFFICE 2,607,474

DRAWBENCH

Donald V. Strock, Youngstown, Ohio, assignor to The Aetna-Standard Engineering Company, Youngstown, Ohio, a corporation of Ohio Application April 15, 1946, Serial No. 662,126

3 Claims. (Cl. 205—7)

This invention relates to draw benches of the type employed in the manufacture of drawn tubes, bars and the like. While the invention will be described herein with reference to a bench particularly adapted to the drawing of tubes, it will be understood that it also is adapted to the manufacture of other articles that can be processed on a draw bench, and such articles are intended to be included when reference is made herein to "tubes."

Conventional draw benches ordinarily comprise a bed upon which is mounted a traveling carriage provided with jaws to grip a tube and draw it over a mandrel supported by a mandrel rod, and through a forming die that is mounted at one end of the bed. At the conclusion of the drawing operation the drawing tube is released and the carriage is returned to the die stand to grip the next tube that is to be drawn through the die. To increase the output of tubes, draw benches have been built with a plurality of mandrel rods and cooperating dies so mounted that a tube to be drawn may be loaded on one mandrel rod during the interval when another mandrel rod is in alignment with the die through which a tube previously loaded on the rod is being drawn.

Such a draw bench is disclosed in Patent No. 2,196,155, issued April 2, 1940, in the name of Howard W. Smith, and assigned to my assignee. The draw bench of the present invention embodies certain improvements over that one disclosed in the Smith patent, particularly in that part of the draw bench commonly called the back bench. Such improvements have to do, among other things, with the manner in which the mandrel rods are mounted and shifted to and from the loading and drawing positions.

Accordingly, a general object of the present invention is the provision of a draw bench of improved construction in which one tube may be drawn over a mandrel and through a die while a second tube is being loaded upon a mandrel rod preparatory to movement to the position where it in turn may be drawn through the die. Another object of the invention is to provide an improved mechanism embodying at least two mandrel rod assemblies that may be shifted alternately between a loading and drawing position while they are maintained parallel each to each and in horizontal positions. A further object is to make provision for locking that assembly that is in the drawing position positively to the draw bench frame and releasing it at the end of the drawing operation. Still another object of the invention is to provide improved and power operated mechanism for shifting the mandrel rod assemblies between the loading and drawing positions. An additional object of the invention is to provide mechanism for shifting the mandrel rods from one to another of two vertically aligned positions without tilting the mandrel rod assemblies either lengthwise or transversely of the mandrel rod axes. Another object is to provide fluid pressure mechanism for shifting the mandrel rod assemblies from one to another position and also for positively locking an assembly in one of such positions. A still further object is to provide an improved mounting for a mandrel rod in the trough of a mandrel rod assembly.

Further objects and advantages of the invention will become apparent from the following description of a preferred form thereof, reference being made to the accompanying drawings. The essential and novel characteristics are summarized in the claims.

Referring now to the drawings: Figure 1 is a side elevation of a draw bench made according to a preferred form of the invention; Figure 2 is a fragmentary section on an enlarged scale and in a plane parallel to Figure 1, showing the assembly adjacent the drawing die; Figure 3 is a section through Figure 1 as indicated by the lines 3—3 thereon; Figure 4 is a side elevation at one end of the draw bench showing the mechanism for moving the mandrel rods towards or away from the die; Figure 5 is an incomplete section parallel to Figure 4 and indicated by lines 5—5 in Figure 6, showing the mechanism by which the mandrel rods are locked in drawing position; Figure 6 is a transverse section as indicated by the lines 6—6 on Figure 5; Figure 7 is a fragmentary section parallel to Figure 6 showing in detail parts of the mechanism by which the mandrel rods are raised and lowered; Figure 8 is a fragmentary plan view of one of the mandrel rod assemblies showing three individual mandrel rods and their supports with the lubricating oil lines removed; Figure 9 is a section through Figure 8 as indicated by the lines 9—9 thereon, showing the oil lines in place; Figure 10 is a transverse section through a modified form of mandrel rod supporting mechanism differing somewhat from that shown in Figures 6 and 7; Figure 11 is a detail section illustrating the driving mechanism for shifting the mandrel rod assemblies; and Figure 12 is a detail showing in cross section the construction of a mandrel rod trough and its supporting arm.

The general arrangement of a preferred form of draw bench built in accordance with the present invention is shown in Figure 1. As there indicated the draw bench comprises a bed 15, a die stand 17, a loading rack 18 above the bed and a carriage 20 movable back and forth on the bed to grip a tube and pull it through the die. The mandrel rod mechanism comprising two groups of mandrel rods and associated mechanism is indicated at 22 and 23, each group having three mandrel rods and mandrels in the embodiment shown; it will be apparent that more or less than this number may be used if desired. The mandrel rod assemblies are moved back and forth between the loading position 22 and the drawing position 23, which positions preferably are in vertical alignment with each other, by rock arms best shown in Figures 6 and 7 and described hereafter in detail. Tubes to be drawn are mounted on the mandrel rods by feed rollers 24 when the mandrel rods are in a position aligned with the loading rack 18, and the tubes are drawn from the mandrel rods when they are in a position in alignment with a die 25.

The mandrel rods, indicated generally at 30 (Figure 2) are hollow or solid and are each provided with the usual plugs or mandrels 32; during the drawing operation the rods of the lower assembly at 23 are advanced toward the die stand so that the plugs are positioned closely adjacent the dies 25 in accordance with customary practice. The rods 30 are disposed in supporting tubes 34 (Figure 5) and these tubes in turn are supported in guide troughs 35. The mandrel rods, tubes and trough of a complete assembly are supported as hereafter shown and described for movement back and forth between the loading and drawing positions.

The tubes to be drawn are gripped by jaws on the carriage 20 and by it are pulled through the die 25. The carriage is mounted for reciprocating movement on the bed toward and away from the dies as shown in Figure 3. Referring now to this figure it will be seen that the bed 15 is made up of two longitudinally extending beams 37 and 38 that support track members 40 and 41 on which the carriage 20 travels back and forth. The track members each constitute toothed rack bars that are engaged by power driven pinions carried by the carriage to move the same along the track. This mechanism is shown and described in detail in copending application Serial No. 599,185, entitled Draw Bench, filed in the name of Glenn W. Garwig and assigned to the present assignee, now Patent No. 2,536,637, issued January 2, 1951.

The beams that support the track members are themselves supported by large frame members 43 spaced along the bed as shown in Figure 1. These members are provided with base portions 44 that extend below the track to provide a generally C-shaped structure to lend stability to the assembly. The beam 37 is supported as shown in Figure 3 by the generally vertical portion of the member 43 and the beam 38 is supported in similar fashion from a downwardly extending portion 45 of the frame.

The loading rack 18 of the draw bench is mounted on the flat tops of the members 43 as shown in Figure 3. Guide blocks 47 may be mounted in the rack 18 to facilitate the alignment of the tubes as they are fed from the rack over the mandrel rods by the feed rollers 24 (Figure 2).

Tubes that have been drawn through the die 25 are discharged from the draw bench as shown in Figure 3 through the space between the track members 40 and 41. Sloping guide rails 50 are provided on the frame members 43 to receive tubes falling upon them when they are released from the carriage and guide them to the open side of the bench where they fall into a receiving trough 52.

The mandrel rod assemblies and the mechanism by which they are shifted are supported by a longitudinally extending frame that appears to the left of and in alignment with the bed 15 shown in Figure 1. This frame comprises an I-beam 53, one end of which is supported on and rigidly secured to a plate 54 secured to the die stand 17 (Figure 2) and the other end of which is secured at 55 (Figure 5) to an end frame built up of structural sections welded together as shown.

The two mandrel rod assemblies are shifted from the upper loading position to the lower drawing position and back again by mechanism best shown in Figures 6 and 7. As stated above, these two positions are in vertical alignment, and hence it is necessary to move one assembly down and out from the top position while the other member is moved up and out from the lower position in order that they may clear each other in passing. In the present embodiment of the invention three mandrel rods are provided in each assembly to permit three tubes to be drawn simultaneously through three dies 25. The assemblies are so shifted that the rods of each assembly maintain a substantially parallel position to the rods of the other assembly at all times, and the rods of each assembly lie at all times in planes substantially parallel to the horizontal. The assemblies are each raised and lowered by rock arms pivoted on axes parallel to the rods and supported by the frame below the level of the dies 25. As many complete sets of these rock arms may be spaced along the frame 53 as may be required accurately to support and move the mandrel rod assemblies.

The sets are all substantially identical as to dimensions and construction, hence only one will be described. As shown in Figures 6 and 7, the guide trough 35 of each mandrel rod assembly is rigidly mounted on an L-shaped supporting bar 56 or 57. The troughs are attached to respective bars by welding, as shown in detail in Figure 12. Each bar is provided at its lower end with brackets 58 and 59 welded thereto to provide bearings at 60 and 61 for the ends of rock arms 64 and 65. The upper rock arm 64 is made from a pair of spaced plates 70 and 71 welded to a sleeve 73 keyed to a rock shaft 75 (Figure 5). The lower rock arm 65 is formed from a pair of plates 77 and 78 welded to a sleeve 79 that in turn is keyed to a rock shaft 80. The plates of the lower rock arm are spaced inwardly of the plates of the upper rock arm (Figure 5) so that the two arms may interfit as they rock to their extreme positions (Figure 7). The outer ends of the shafts 75 and 80 are journaled at 82 and 84 in a plate 85 that comprises part of the end frame of the draw bench (Figure 5), and at their other ends the shafts are mounted in bearings (not shown) that are similar to the bearings at 82 and 84 and are adjacent the beam support 54.

The shafts that actuate the rocker arms are rotated in their bearings by the mechanism illustrated in Figure 11. As there shown an angle plate 87 fits into a channel of the beam 53 and is welded to it. Carried by the plate is a subframe 88 that at one end supports a cylinder 89 and at the other end provides a sliding bearing 90 for a piston rod 92 secured to a piston within the cylinder 89. The rod 92 is operatively connected through a link 94 with a sprocket chain 95 that rides on sprockets 97 and 98 on the shafts 75 and 80 respectively. As the piston rod 92 is reciprocated in either direction by reason of fluid pressure admitted to and exhausted from the cylinder 89, it acts to move the sprocket chain 95 and to rotate sprockets 97 and 98 and shafts 75 and 80 through a partial revolution. As the shafts are rotated, they transmit a corresponding movement to the rocker arms 64 and 65 to shift the mandrel rod assemblies through arcuate paths between the loading and drawing positions.

The positions of the assemblies during their movement is indicated in solid and dotted lines in Figures 6 and 7. When the parts are in the position shown in Figure 7, that assembly supported by the bars 56 is in the upper or loading position, and that assembly supported by the bars 57 is in the lowered or drawing position. To reverse the relative positions of the assemblies, the shafts 75 and 80 are rocked in a counterclockwise direction by actuating the piston in the cylinder 89 (Figure 11). This motion causes the upper assembly to travel downwardly and initially to the left as shown by the arrows in Figure 6, while the lower assembly travels upwardly and initially to the right. When the rock arms 64 and 65 are substantially horizontal as shown by the dotted lines in Figure 6, the assemblies will have attained side by side positions. It will be evident from this figure that the motion imparted to the assemblies allows them to clear each other as the one is lowered and the other is raised. Further counterclockwise movement of the shafts causes the left hand assembly in Figure 6 to move downwardly and inwardly until its mandrel rods are in alignment with the individual dies and at the same time the right hand assembly moves upwardly and inwardly until its mandrel rods are in alignment with the feed rolls 25 and the rack 18.

A major advantage of the present invention arises from the fact that each assembly of mandrel rods, tubes and supporting trough is always substantially horizontal and never rocked or tilted or inverted. This advantage is attained by the construction already described in connection with Figures 6 and 7, and the maintenance of the horizontal position of the assemblies is due to the fact that all of the sets of rocker arm mechanisms (two of which are shown) the bars 56 and 57, as well as the rock arms 64 and 65, associated with each mandrel assembly are of substantially identical dimensions.

Due to the fact that the entire assembly is bodily shifted from one position to the other, it is necessary positively to lock each of the mandrel rod assemblies to the frame to anchor the mandrel rods when the parts are in the drawing position. In addition to locking positively the mechanism as a whole, it is further necessary to control accurately the axial motion of a mandrel rod toward the die to insure that a plug 32 (Figure 2) is in proper relation to the die orifice as the tube is pulled through the die by the carriage 20, and this is largely accomplished by the mechanism now to be described and shown particularly in Figures 5, 8 and 9.

Two structurally identical mandrel rod assemblies are shown in Figure 5 with the upper mechanism in loading position and the lower mechanism in drawing position. As previously described, the mandrel rods are provided in two sets of three each and each set is mounted in a trough 35 formed as shown in Figure 12 with flanges 112, and adapted to receive lubricant in excess of that used in the mandrel tubes. The supporting tubes 34 in which the mandrel rods are contained are supported in blocks 103 (Figure 5) to maintain them in alignment with the die block and a short distance above the bottom of the trough 35. Lubricant may be supplied to the interior of the tubes 34 as hereafter described. The bottom portion of each trough 35 terminates at 110 (Figure 5) and two side flanges 112 (Figure 9) continue and terminate at a cross bar 114 at that end of each mandrel rod assembly remote from the dies 25.

Each of the three mandrel rod mechanisms mounted in each trough 35 and its flanges 112 comprises the tube 34 in which is the hollow or solid mandrel rod 30, one end of which is secured at 116 to a sleeve 118 slidably received in a larger sleeve 120. This latter sleeve is threaded in a cross block 122 disposed between the extending portions of the trough flanges 112 and the sleeve 120 is locked in adjusted position by a locking nut 124. The mandrel rod 30 and the sleeve 118 which is slidable in the sleeve 120 are limited in axial movement in one direction by a pair of locking nuts 126 threaded on the sleeve 118 and adapted to seat against the end of the sleeve 120 as shown. The nuts normally are held against the outer sleeve 120 by a compression spring 130 that surrounds sleeve 118 and at one end bears against outer sleeve 120 at 132 (Figure 8) and at the other end against a nut 134 adjustably mounted on the sleeve 118.

The mechanism just described permits movement of the mandrel rod 30 and its plug 32 with respect to the trough and toward and away from the die 25 (Figure 2). The spring 130 normally urges the plug 32 as close to the die as the nut 126 and sleeve 120 will permit. When the pointed end of the tube to be drawn is pushed into the die, the plug can only advance as far as the inside diameter of the tube point permits, and frequently the plug cannot advance to the proper position in the die. When the drawing commences, the point advances through the die and the compressive force of the spring pushes the plug and rod forward into the proper position in relation to the die. The degree of spring compression and the position of the mandrel rod 30 with respect to the cross block 122 are governed respectively by the adjustment of the nut 134 and the position of sleeve 120 in the cross block 122.

During the operation of drawing a tube through the die 25 and across mandrel 32, it is desirable to supply lubricant at the mandrel on the inside of the tube. In the machine of the present invention this is accomplished by making the mandrel rods 30 hollow for their entire length and forcing lubricant through from the anchored end and the sleeve 118. For this reason the sleeves and rods are provided with fluid tight connections at 116 where they are joined. At the other end of each sleeve 118 is a connection 135 to a flexible hose 136a, 136b or 136c. Each of the hoses for each of the three sleeves 118 is connected as shown in Figure 9 to the hollow cross block 122 from which they are supplied with lubricant; the connections are arranged as shown so that each hose may have a loop of as large a radius as possible in order that the hoses may not be bent too sharply as adjustments are made between the respective sleeves 120 and the cross block 122. Lubricant under pressure is supplied to the hollow interior of the cross block by a fitting 140 which communicates with connections 141a, 141b, and 141c where the hoses 136a, 136b and 136c, respectively, are connected.

In order to lock each mandrel rod assembly including its associated trough 35 against lateral movement relative to the frame during the drawing operation, the follower mechanism shown in Figures 5, 8 and 9 is provided. This comprises an air cylinder 145 secured at each of its ends to brackets 147 and 148 which in turn are slidably mounted on guide rods 150 and 151. These rods are each secured at one end to the cross member 114 and at the other end to a cross bar 152 (Figure 5) welded on the underside of the extension members 112. The cylinder has mounted within it a piston 153 that is secured to a piston rod 154 (Figures 5 and 8) rigidly anchored at one end to the cross member 114. Fluid under pressure is admitted to either end of the cylinder through connections 156 or 157 so that reaction of the fluid on the piston and the cylinder end walls will move the latter back and forth on the guide rods 150 and 151. The cylinder is provided at its left hand end (Figure 5) with a packing gland 159 and at its right hand end with a locking plunger 160. The locking plunger is rigidly secured to the cylinder end and is adapted to be seated within an opening or recess 162 of a block 165 that is supported and secured on top of the end frame 55 of the frame that supports the mandrel rod assemblies. The end frame, the block 165 and the I-beam 53 are all rigidly welded together.

When a mandrel rod assembly is in the tube drawing position 23 (Figure 1), air is admitted at 157 to the cylinder 145 thereby to move the plunger 160 toward the right (Figure 5) and into the recess 162. A block 170, rigidly secured to the under side of the trough 35, lies in lateral abutment with the right hand end of the block 165 and prevents the fluid pressure against the cylinder from moving the supporting trough 35 to the left (Figure 5).

Lubricant is supplied to the inside of the mandrel supporting tubes 34 and to the inside of the hollow mandrel rods 30 by a lubricating system shown in Figure 4 and that is electrically interlocked with the movement of the mandrel assemblies so that lubricant is supplied only to the assembly that is in drawing position. Fittings 172 are provided on the underside of each trough to communicate with the interior of each tube 34. To each fitting is secured a two way valve 174 and to each valve is fastened a section of flexible hose 175a or 175b. These hoses from each mandrel rod assembly are connected at 180 to different ports on the outlet side of a four-way solenoid operated valve 182. The insides of the mandrel rods 30 are supplied through two way valves 184 with lubricant from the cross block 122 previously described. Each of the two blocks 122 is supplied with lubricant through flexible hoses 185a and 185b from each block to different outlet ports of the valve 182.

The arrangement of oil lines just described at the valve 182 is such that operation of its solenoid will pass oil from a supply pipe 190 only to the mandrel rods 30 and the tubes 34 of that mandrel rod assembly that is in the drawing position. When an assembly is moved from the drawing position to the loading position the supply of lubricant to it is automatically cut off. A return pipe 191 leads from the valve back to the central supply.

Air pressure is used to operate the cylinder 89 by which the shafts 75 and 80 are rotated and also to operate the cylinders 145 of each mandrel rod assembly. Air under pressure is admitted through a regulator valve 200 to a four-way solenoid operated valve 202. Air passes from the valve to lines 205a, 205b and 206a, 206b that lead to the respective supply fittings 156 and 157 of each of the cylinders 145. At the desired time, air is admitted through the valve 202 to fitting 157 of the particular cylinder 145 of that mandrel rod assembly that is in drawing position and thereby advances the mandrel rods toward the die stand projecting the pointed ends of the tubes loaded thereon through the dies and moves its locking plunger into the recess 162. An interlock is provided so that at this time lubricant begins to be supplied to the hollow mandrel rods 30 and the tubes 34 of the assembly in drawing position. When it is desired to shift the mandrel rod assemblies, air is admitted at the fitting 156 of the lowermost cylinder to move the mandrel rods away from the die stand and withdraw the locking plunger from the recess 162. Air is then supplied to the cylinder 89 to rotate the shafts 75 and 80 to interchange the mandrel rod assemblies from the positions that they previously occupied.

A modified form of mandrel rod assembly and its supporting mechanism is shown in Figure 10. In this construction, the troughs supporting the mandrel rods are not maintained quite horizontal, as is the case with the mechanism shown in Figures 6 and 7, although they can be described as always substantially horizontal. This modified form of construction may be mounted on a frame like that built around beam 53 (Figure 5) although in the present instance, it is desirable to employ a modified form of frame construction in which a beam 210 is used with its web lying horizontal. This beam is supported on frame members 211 in the form of modified structural shapes with a web 212 and side plates 214.

The mandrel rod assemblies are shifted between the loading position 22 and the drawing position 23 by two or more rock arm mechanisms spaced apart along the beam 210, and connected to a shaft 215 extending between and mounted in bearings in frame members 211. Secured to the shaft for rotation through an arc of approximately 120° are two rock arms 216. At their ends each rock arm makes pivotal connection at 220 with supporting rod members 221 and 222. At their upper ends these rod members support troughs 225 in which are mounted the usual mandrel rods 30 and their surrounding tubes. At their lower ends, the rods 221 and 222 are received in sliding bearings 228 that are in turn pivotally mounted at 229 on adjacent frame members 211.

It will be apparent from the construction described that as the rock arms 216 are rotated about the axis of the shaft 215, the rods 221 and the mandrel rod assembly supported by them will be moved through the dotted line position of Figure 10 and the rods 221 will slide correspondingly in the pivotal bearings 228. Further movement of the rock arms 216 will ultimately bring the left hand assembly of rods 221 down into the position occupied by the right hand mandrel rod assembly shown in Figure 10 on rods 222. At the same time the latter assembly, by virtue of its connections with rock arms 216, will have been moved up until its mandrel rods are in the upper or loading position. The two mandrel rod assemblies are moved far enough outwardly by rock arms 216 to pass each other as they move from one to the other position.

The rock arms 216 are rotated by a piston and cylinder mechanism 230 corresponding generally to the cylinder 89 described in connection with Figure 11. The cylinder 230 is pivotally mounted at one end at 232 to a bracket rigid with a frame 211. At its other end the cylinder is provided with a packing gland through which passes a piston rod whose piston is within the cylinder and whose free end is connected at 235 to one of the rock arms 216. Admission of fluid under pressure into the cylinder 230 will cause relative movement between it and its piston to rotate the rock arms 216 about the axis of the shaft 215 in the same manner as the mechanisms in Figures 6 and 7 are moved. Since the two rock arms 216 are connected through the shaft 215 for simultaneous movement only one cylinder mechanism 230 is required.

It will be seen that the mandrel rod assemblies are tilted only slightly in their travel from one position to the other, substantially the extreme amount of tilt being shown in the broken line position in Figure 10. Thus, with this arrangement, just as in the first modification, lubricant can be retained in the supporting trough, and if desired open troughs may be employed instead of the tubes 34.

Reference is hereby made to my co-pending application Serial No. 247,985 filed September 24, 1951 which contains claims directed to the modified form of the invention just described.

From the foregoing description of two preferred forms of my invention, it will be evident that I have provided an efficient type of draw bench that can be operated to draw one or more tubes simultaneously from supporting mandrel rods. The mandrel rods are provided in two independent assemblies and are horizontal in both the loading and drawing positions and may be shifted between these positions without being rocked, tilted or inverted. The mandrel rod assemblies are supported and shifted by a plurality of identical mechanisms, and this results in considerable economy of manufacture because many duplicate parts may be used. With the draw bench of the present invention, it is possible simultaneously to lock a mandrel rod assembly immovably with respect to the die and at the same time advance the mandrels on the mandrel rods of the locked assembly to drawing positions adjacent the dies.

Those skilled in the art will appreciate that various changes and modifications may be made in the apparatus described herein without departing from the spirit and scope of my invention. Therefore, it is to be understood that my patent is not limited to the preferred forms described in detail herein or in any manner other than by the scope of the appended claims.

I claim:

1. In a draw bench including a die stand, a plurality of drawing dies in said die stand with their axes horizontal and parallel to each other, and a back bench, the combination of two mandrel rod assemblies each including as many mandrel rods as there are dies in said die stand, the mandrel rods of each assembly lying horizontal and parallel to each other; a mandrel at one end of each mandrel rod; supporting means for each mandrel rod assembly transmitting thereto, but without producing therein substantial rotation about its axis, transverse movement between a tube loading position and a tube drawing position, said means including elements to retain the mandrel rods of each assembly horizontal and in the same relative position with respect to each other during movement from one to the other position; and a follower acting in unison on the mandrel rods of the assembly in drawing position simultaneously to locate said mandrels in cooperative drawing relation to said dies respectively and to lock said assembly in drawing position.

2. A draw bench as in claim 1, said supporting and retaining means including the combination of a supporting frame; two horizontally extending vertically aligned shafts rotatably mounted in said frame in spaced relation to each other; two rock arms, one mounted on each of said shafts, each of said rock arms having opposed arms extending outwardly on each side of its shaft; two vertically standing bars carrying the mandrel rod assemblies, one at each side of said shafts, each pivotally secured to each of the ends of said rock arms at its side of the shafts; and means common to the two shafts to rotate both of said shafts simultaneously.

3. A mandrel and manipulating mechanism including a frame, two mandrel rod assemblies each including a horizontally disposed mandrel rod with a mandrel at one end thereof; supporting means for each mandrel rod assembly transmitting thereto, but without producing therein substantial rotation about its axis, transverse movement between a tube loading position and an operating position, said means including elements to retain the mandrel rod of each assembly horizontal during movement from one to the other position; means acting on the mandrel rod of the assembly that is in operating position and movable longitudinally thereof to shift said mandrel rod longitudinally to place said mandrel in operative location; means movable with said longitudinally moving means and by said movement locking said mandrel rod assembly in operative position; and a power system imposing on said supporting means relative movement in two laterally spaced but mutually similar loci extending uniformly from end to end along said back bench.

DONALD V. STROCK.

REFERENCES CITED

The following references are of record in the file of this patent:

UNITED STATES PATENTS

| Number | Name | Date |
| --- | --- | --- |
| 2,196,155 | Smith | Apr. 2, 1940 |
| 2,331,953 | Andrews | Oct. 19, 1943 |
| 2,395,290 | Nye | Feb. 19, 1946 |